(12) United States Patent
Kraft

(10) Patent No.: US 7,269,413 B2  
(45) Date of Patent: Sep. 11, 2007

(54) TELEPHONE LOCATION CALLER ID

(75) Inventor: Clifford H. Kraft, Naperville, IL (US)

(73) Assignee: ORO Grande Technology LLC, Naperville, IL (US)

( * ) Notice: Subject to any disclaimer, the term of this patent is extended or adjusted under 35 U.S.C. 154(b) by 16 days.

(21) Appl. No.: 11/199,686

(22) Filed: Aug. 9, 2005

(65) Prior Publication Data

US 2006/0034441 A1    Feb. 16, 2006

Related U.S. Application Data

(60) Provisional application No. 60/600,341, filed on Aug. 10, 2004.

(51) Int. Cl.  
H04M 3/42     (2006.01)

(52) U.S. Cl. .................. 455/415; 412/422.1; 412/457; 412/456.1

(58) Field of Classification Search ............. 455/415, 455/412.2, 422.1, 457, 456.1, 456.6; 379/142.1, 379/142.02, 142.04, 142.06  
See application file for complete search history.

(56) References Cited

U.S. PATENT DOCUMENTS

| | | | | |
|---|---|---|---|---|
| 5,369,691 | A * | 11/1994 | Cain et al. | 379/106.03 |
| 5,396,543 | A * | 3/1995 | Beeson et al. | 455/560 |
| 6,049,718 | A * | 4/2000 | Stewart | 455/456.4 |
| 6,424,711 | B1 * | 7/2002 | Bayless et al. | 379/355.09 |
| 6,539,080 | B1 * | 3/2003 | Bruce et al. | 379/88.17 |
| 6,643,516 | B1 * | 11/2003 | Stewart | 455/456.6 |
| 6,721,406 | B1 | 4/2004 | Contractor | 379/142.6 |
| 2002/0118812 | A1 * | 8/2002 | Contractor | 379/220.01 |
| 2002/0155845 | A1 * | 10/2002 | Martorana | 455/456 |
| 2004/0257273 | A1 * | 12/2004 | Benco et al. | 455/415 |
| 2005/0008135 | A1 * | 1/2005 | Bressler | 379/211.01 |
| 2005/0272448 | A1 * | 12/2005 | Tran et al. | 455/456.6 |
| 2005/0287997 | A1 * | 12/2005 | Fournier | 455/415 |
| 2006/0177030 | A1 * | 8/2006 | Rajagopalan et al. | 379/142.07 |

* cited by examiner

*Primary Examiner*—Joseph Feild  
(74) *Attorney, Agent, or Firm*—Clifford Kraft

(57) ABSTRACT

A location caller ID feature where a cellular telephone placing a called is located by a telephone service and a message relating to that location is transmitted to a called telephone. The called telephone can display the location of the calling phone in human readable terms.

20 Claims, 3 Drawing Sheets

**Sam Smith
312 381-3397
LOCATION:
Wacker & Adams
Chicago**

FIG. 2A

**LOCATION:
30 Mi. from St. Louis
Highway 55 N.

Mobile – In Motion**

FIG. 2B

**LOCATION:

Hackensack NJ

Fixed**

FIG. 2C

MODIFIED CALLER ID MESSAGE

| HEADER | FLAGS | CALLER ID | LOCATION INFORMATION |
|--------|-------|-----------|----------------------|

FIG. 3

TELEPHONE LOCATION CALLER ID

This application is related to, and claims priority from, Unites States Provisional patent application No. 60/600,341 filed Aug. 10, 2004. Application 60/600,341 is hereby incorporated by reference.

FIELD OF THE INVENTION

The present invention relates to telephone caller identification (caller ID) and more particularly to a location caller ID that displays or otherwise indicates the location of the calling party.

DESCRIPTION OF THE PRIOR ART

Current caller ID shows a phone number, a name and perhaps can flash a photo up on a cellphone if such a photo is stored. Current caller ID cannot show where the calling party is located.

Recently cellular telephone manufacturers have been putting technology into cellphones to locate them in terms of longitude and latitude. Two different systems are known in the art: 1) location using characteristics of the received radio signals in the cellular network such as time of arrival and angle of arrival, and 2) assisted GPS location. Qualcomm Corp. currently has a chip-set solution that called gpsOne that is a hybrid of both methods.

The United States Congress has passed legislation requiring cellular providers to be able to locate cellular telephones for emergency 911 (E911) service.

In short, soon every new cellphone will have installed capability to be located. Fixed phones, of course, have known locations. Soon also, cellular providers will have the capability to locate almost any cellular telephone in using their system. What is badly needed is a form of location-based caller ID that tells the called party where the calling party is located.

SUMMARY OF THE INVENTION

The present invention relates to a telephone location caller ID system where a calling telephone at a particular location places an outgoing call to a called telephone that has a display (either mobile or fixed). The called telephone, upon receiving the call, displays a message related to the location of the calling telephone. At least one telephone carrier service transmits the location of the calling telephone to the called telephone. If the calling telephone is a mobile phone, the cellular service can determine its location by any of several methods known in the art including assisted GPS, time of flight, or by any other location determining method. If the calling telephone is fixed, its telephone service provider can give its fixed location.

Telephone providers can transmit messages concerning the calling phone's location either by in-band or out-of-band signaling known in the telephone arts. The final location message can be sent to the called telephone using the same message that transmits caller ID (with perhaps extra fields to contain location data).

The system can send the location in human readable terms by looking up a particular longitude and latitude (or other position representation) in a data base or location dictionary. The displayed message at the called telephone can state the actual location (such as: "Route 59 at 75th street").

For privacy, a calling telephone can opt-out or set a privacy mode where its location is not transmitted. In this case, or any case where location information is not available, a message to that effect can be displayed at the called telephone.

DESCRIPTION OF THE FIGURES

FIGS. 2A-2C show embodiments of location displays.

FIG. 3 shows transmission of a signaling message containing location.

Figure 1:
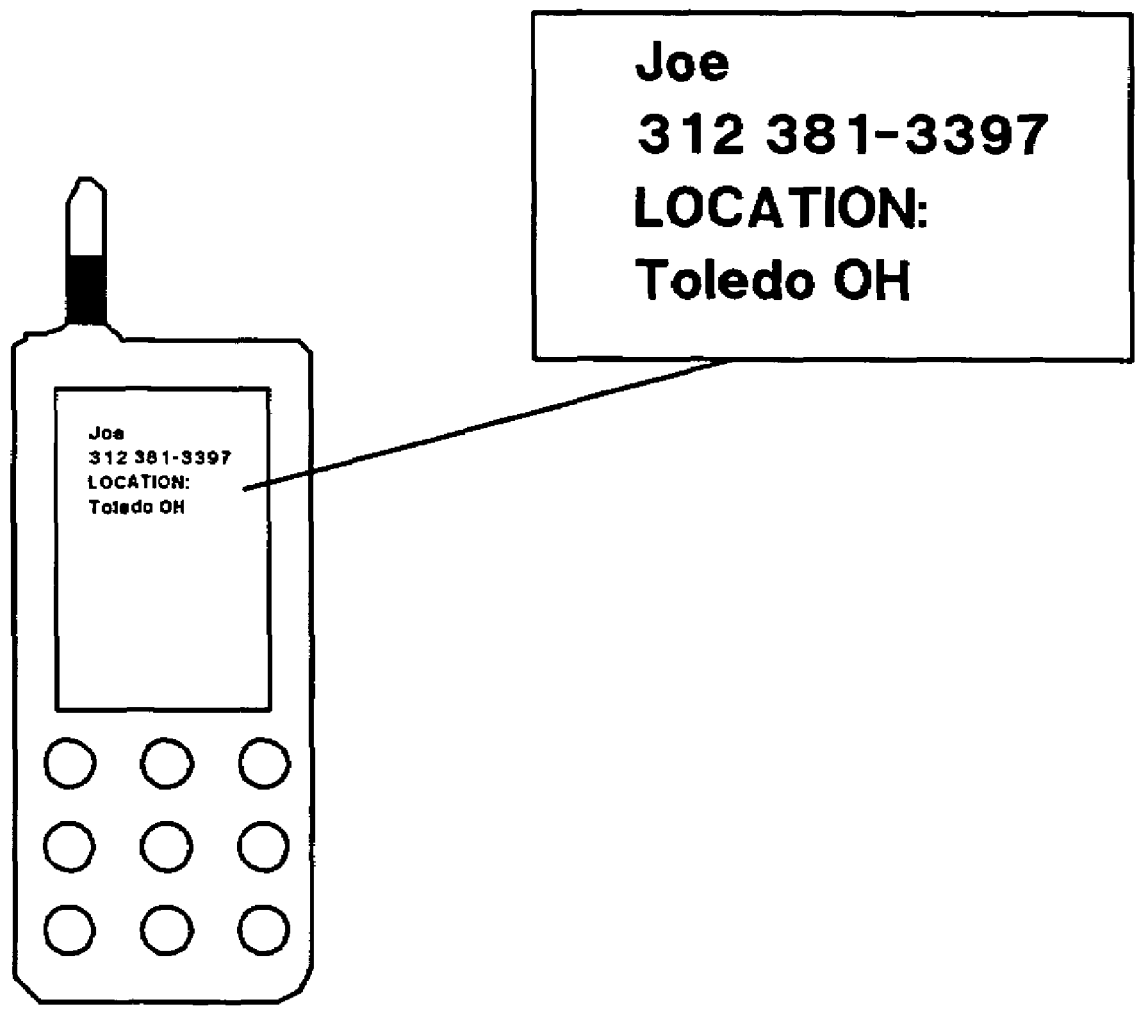
FIG. 1 shows a cellular telephone with a display showing a location caller ID.

Several illustrations and drawings have been presented to aid in the understanding of the present invention. The scope of the present invention is not limited to what is shown in the figures.

DESCRIPTION OF THE INVENTION

As stated above, it will soon be very easy for a cellular provider to accurately locate any cellphone that is turned on in its system. Fixed telephone providers know the location of fixed telephones. Thus, it will become relatively easy to transmit the location of any cellular (or fixed) telephone as a part of caller ID or by any other telephone signaling technique.

Caller ID location information can easily be encoded into existing or new passed control data in the telephone system. It will be possible to provide this data as combination caller ID along with the calling telephone number. While the present invention is particular applicable to cellular telephones, it can be just as easily used with fixed telephones.

The present invention allows reporting of location as longitude and latitude; however, that type of presentation is not very useful. Rather, a database operated by the carrier or a third party can more conveniently translate raw location to a format that is readily understood by humans. Examples of human understandable location data might be: New York City; Wacker and Adams, Chicago Ill.; 30 Miles North of Albany N.Y.; I-40 20 Miles East of Albuquerque N.M.; etc.

FIG. 1 shows a cellular telephone with a display window. On the display window, a caller ID is displayed (usually shown when the telephone rings). The caller ID contains the usual name and telephone number. In addition, it contains a field called: LOCATION. After the word LOCATION:, a human readable form of the location of the caller is shown. In the case that location data was not available, a field like: NO LOCATION DATA could be displayed. While FIG. 1 shows a cellular telephone, this type of display could be adapted to work with any telephone. Any method of communicating the location of the calling telephone to the called telephone is within the scope of the present invention. In particular, a cellular system can communicate the information with a CCITT out-of-band or in-band signaling message known in the art or by any other type of signaling message. The telephone provider can finally send the location of the calling telephone to the called telephone during the ring interval along with standard caller ID known in the art.

Land line telephone carriers could also supply location data for fixed telephones. For example, the town and state of the fixed phone could be supplied. Alternatively the local carrier at the call receiving end could translate the ID'd telephone number to provide fixed locations (for example, area code 312 is known to be Chicago; 212 is known to be New York City). In some cases, it would be necessary to go beyond the area code into the first three digits of the number itself.

FIGS. 2-4 shows alternative ways of displaying location. Any method of displaying or otherwise indicating the location of the caller (including longitude and latitude) is within the scope of the present invention.

As carriers begin to provide the ability to locate cellular telephones, privacy can become a concern. The present invention envisions being able to opt-out of the location ID program. For example, if a person did not want his or her location presented to the called party, he or she could enter a single opt-out or privacy code or key to prevent location information from being transmitted (E911 location information would always be transmitted).

An example of how the system could work is as follows: cellular telephone A is being carried by a person in a car on Interstate 25 south of Denver. This person calls his daughter's cellphone in Lafayette Ind. The caller dials his daughter's number without pressing the opt-out code (or permanently setting an opt-out option). The cellular service receives the dial out request in a normal manner from the base station handling the caller's cellphone. The cellular service sees that there is no opt-out, so it initiates an assisted GPS location, other type of location such as time of flight, on the calling cellphone. Pseudo-ranges are returned as known in the art of assisted GPS location which allow the cellular service to locate the telephone in terms of longitude and latitude. An immediate request is made to a translation database, and a human readable phrase is returned, in this case: I-25 20 Miles South of Denver Colo. In addition, some location methods can further determine that the cellphone is in motion. If this is the case (and this information can be determined), the word Mobile or In-Motion can be appended to the message. The entire message along with the normal caller ID can transmitted via the landline call request using standard out-of-band signaling known in the telephony arts. Extra protocol fields can be used in the signaling format to transmit the extra caller data. Finally, the land-line system reaches the carrier system at the final location (which is wherever the cellphone currently is—found by methods well known in the cellular arts). The caller ID, with location data, is forwarded to the correct base station and the actual called cellphone is ordered to ring. Along with the ring command, normal caller ID and the location text is transmitted to the called phone. The called cellphone can display the name (which can be in the address book of the phone), the calling number (which can be transmitted in the normal caller ID way), and the location text (which can be transmitted along with the normal caller ID or by any other means). Optionally, the cellphone can show a stored photo ID if a photo is available.

The final display on the called cellphone as it rings can be like that shown in FIG. 1 with the name of the caller if it is in the address book (alternatively the name could be transmitted along with caller ID), the caller phone number, and the message. For example, the display shown in FIG. 1 might show in this example:

DAD 415 222-3392

LOCATION: I-25 20 Miles South of Denver Colo.

MOBILE (moving south)

The line DAD depends on dad's number being stored in the address book. It might be JOHN SMITH or the like. The calling number is the cellphone number (which in this example is a San Francisco area code). The location is as described above, and the word Mobile and Moving South would depend on how much information the service in the calling area was willing to provide (or could provide).

FIGS. 2A-2C show alternative human-readable displays of location data of a particular calling telephone. Any type of location display or message is within the scope of the present invention. The display on the called telephone can be an LCD display or the like, or any other type of visual display.

FIG. 3 shows a diagram of a signaling message. This message can be similar to a standard caller ID in-band or out-of-band message that is transmitted to the called telephone. During an intermediate step between telephone providers, it can be a CCITT or other standard signaling message. In the case of a cellular telephone, it can be on a control channel. The message one or more extra fields to contain location information, either in longitude and latitude, or in human readable form.

Several descriptions, illustrations and examples have been provided to better aid in the understanding of the present invention. One skilled in the art will realize that many changes and variations are possible Each of these changes and variations is within the scope of the present invention. The present invention is not limited to the illustrations, descriptions or examples given.

I claim:

1. A telephone location caller ID system comprising:
   a calling telephone with a location, said calling telephone placing an outgoing call;
   a called telephone having a display, said called telephone receiving said call, said display displaying a message related to the location of said calling telephone, said message indicating if said calling telephone is in motion;
   at least one telephone carrier service transmitting the location of said calling telephone to said called telephone.

2. The system of claim 1 further comprising at least one telephone carrier service determining the location of said calling telephone.

3. The system of claim 1 further comprising transmitting a message related to the location of said calling telephone using out-of-band signaling.

4. The system of claim 1 further comprising transmitting a message related to the location of said calling telephone using in-band signaling.

5. The system of claim 1 wherein said displayed message is presented in human readable terms.

6. The system of claim 1 wherein said calling telephone can prevent transmission of its location.

7. The system of claim 6 wherein said message indicating if said calling telephone is in motion also indicates a direction of motion.

8. A system for transmitting a calling telephone's location to a called telephone comprising:
   a means for receiving a calling telephone's location from a telephone service provider;
   a means for passing said location to a called telephone;
   a means for causing said called telephone to display said calling telephone's location;
   a means for causing said called telephone to display if said calling telephone is in motion.

9. The system of claim 8 wherein said means for receiving a calling telephone's location is a signaling message.

10. The system of claim 9 wherein said signaling message is in-band.

11. The system of claim 9 wherein said signaling message is out-of-band.

12. The system of claim 9 wherein said signaling message is a CCITT message.

13. The system of claim 8 wherein said means for causing the called telephone to display the location of the calling telephone is a message from a telephone service provider to a user telephone unit commanding a display at said user telephone unit to display said location.

14. The system of claim 8 wherein said called telephone displays a direction of motion.

15. A method for causing a called telephone to display location of a calling telephone comprising the steps of:
   receiving a message containing said location of said calling telephone;
   passing said message to a called telephone;
   commanding said called telephone to display said location;
   commanding said called telephone to display a message indicating if said calling telephone is in motion.

16. The method of claim 15 wherein said message indicating if said calling telephone is in motion also indicates a direction of motion.

17. The method of claim 15 wherein said location of said calling telephone is determined by assisted GPS or time of flight.

18. The method of claim 15 wherein said location is displayed on an image display device attached to said called telephone.

19. The method of claim 18 wherein said image display device is an LCD display.

20. The method of claim 15 wherein said location is displayed at said called telephone in human readable terms.

* * * * *